United States Patent
Sato et al.

(10) Patent No.: US 8,039,976 B2
(45) Date of Patent: Oct. 18, 2011

(54) POWER SUPPLY CONTROL APPARATUS AND METHOD FOR HYBRID VEHICLE

(75) Inventors: Eiji Sato, Nishikamo-gun (JP); Ryoji Oki, Toyota (JP); Junichi Takeuchi, Handa (JP)

(73) Assignees: Toyota Jidosha Kabushiki Kaisha, Toyota (JP); Kabushiki Kaisha Toyota Jidoshokki, Kariya (JP)

( * ) Notice: Subject to any disclaimer, the term of this patent is extended or adjusted under 35 U.S.C. 154(b) by 418 days.

(21) Appl. No.: 12/310,128

(22) PCT Filed: Jul. 11, 2007

(86) PCT No.: PCT/JP2007/064132
§ 371 (c)(1),
(2), (4) Date: Feb. 12, 2009

(87) PCT Pub. No.: WO2008/035503
PCT Pub. Date: Mar. 27, 2008

(65) Prior Publication Data
US 2010/0001523 A1    Jan. 7, 2010

(30) Foreign Application Priority Data
Sep. 20, 2006   (JP) .................................. 2006-254307

(51) Int. Cl.
*H02P 9/04* (2006.01)
(52) U.S. Cl. ..................................................... 290/40 C
(58) Field of Classification Search ............... 290/40 A, 290/40 B, 40 C, 40 F, 40 R; 180/65.21, 65.225, 180/65.23
See application file for complete search history.

(56) References Cited

U.S. PATENT DOCUMENTS

| | | | |
|---|---|---|---|
| 5,796,175 A | 8/1998 | Itoh et al. | |
| 6,276,472 B1 | 8/2001 | Takashima et al. | |
| 6,335,574 B1 | 1/2002 | Ochiai et al. | |
| 6,828,742 B2 | 12/2004 | Suzuki et al. | |
| 2001/0013702 A1* | 8/2001 | Yanase et al. ............... | 290/40 C |

(Continued)

FOREIGN PATENT DOCUMENTS

JP    A-9-46921    2/1997

(Continued)

OTHER PUBLICATIONS

Mar. 2, 2010 Office Action issued in Russian Patent Application No. 2009114739/11(020089) (with translation).

*Primary Examiner* — Nguyen N Hanh
(74) *Attorney, Agent, or Firm* — Oliff & Berridge, PLC

(57) ABSTRACT

When the temperature of an engine and a main battery is low at the time of activating a vehicle system, an ECU starts the engine in advance and outputs a running permission signal after completion of engine startup. At this stage, the ECU suspends a defect diagnosis operation on a subsidiary load and feedback-controls the DC/DC converter by setting the voltage control value to a level lower than the output voltage from the subsidiary battery and at least the lower limit of the operating voltage of the ECU. The ECU feedback-controls the DC/DC converter by setting the voltage control value to a level of at least the output voltage of the subsidiary battery in response to completion of engine start-up. Then, the suspension of the defect diagnosis operation on the subsidiary load is canceled and a running permission signal is output.

8 Claims, 8 Drawing Sheets

U.S. PATENT DOCUMENTS

| | | | |
|---|---|---|---|
| 2004/0046394 A1* | 3/2004 | Lim | 290/40 C |
| 2006/0052915 A1 | 3/2006 | Sato | |
| 2008/0157539 A1* | 7/2008 | Tani et al. | 290/40 C |

FOREIGN PATENT DOCUMENTS

| | | |
|---|---|---|
| JP | A-2001-65437 | 3/2001 |
| JP | A-2001-128305 | 5/2001 |
| JP | A-2001-320807 | 11/2001 |
| JP | A-2003-70103 | 3/2003 |
| JP | A-2003-289601 | 10/2003 |
| JP | A-2003-333835 | 11/2003 |
| JP | A-2004-183570 | 7/2004 |
| JP | A-2004-274945 | 9/2004 |
| RU | 2 282 301 C2 | 8/2006 |

\* cited by examiner

POWER SUPPLY CONTROL APPARATUS AND METHOD FOR HYBRID VEHICLE

TECHNICAL FIELD

The present invention relates to a power supply control apparatus and a power supply control method for a hybrid vehicle. Particularly, the present invention relates to a power supply control apparatus and a power supply control method for a hybrid vehicle including a motor that receives power supply to start an internal combustion engine.

BACKGROUND ART

A hybrid vehicle that runs according to the driving force from at least one of the engine and motor is attracting attention as one measure directed to environmental problems. In such a hybrid vehicle, a high-voltage battery directed to running the vehicle, supplying power to the motor, is incorporated. The electricity stored in this running-purpose battery is also used for engine startup. Specifically, electricity is supplied to a motor generator coupled to the engine, and the engine is started by driving the motor generator serving as a motor.

In a hybrid vehicle, a subsidiary battery of low voltage for controlling the run as well as to supply electricity to accessories mounted on the vehicle is also incorporated. The subsidiary battery incorporated in a hybrid vehicle, as compared to those in a system that runs only by means of an engine, also functions as a power source for control of high-voltage systems including the running-purpose battery, in addition to the function as a power source for accessories. The importance of subsidiary batteries has become higher in accordance with the increase of the load. Conventional hybrid vehicles are mounted with a converter circuit that converts the electrical energy of the high-voltage system into low voltage to charge the subsidiary battery, taking into account the supply of electrical energy to the subsidiary battery (for example, refer to Japanese Patent Laying Open Nos. 2003-70103, 2003-189401, and 2001-320807).

In such hybrid vehicles, the running-purpose battery supplies electricity of a constant level to the accessories and subsidiary battery via the converter circuit, regardless of whether the vehicle is in an arrested mode or a running mode. In the case where the output performance of the running-purpose battery is extremely degraded due to being situated in a low temperature state, sufficient electricity from the running-purpose battery cannot be supplied to the motor generator when the engine is to be started by the motor generator. There was a problem that engine startability is not reliable.

To avoid such an event, Japanese Patent Laying-Open No. 2003-70103, for example, discloses a control apparatus for a hybrid vehicle characterized in that the drive of the converter circuit is stopped when the engine is to be started by means of the motor generator.

According to the control apparatus for a hybrid vehicle disclosed in Japanese Patent Laying-Open No. 2003-70103, control of automatic startup of the engine is effected by applying a driving force to the engine through the motor generator. When the capacity of the high-voltage battery is reduced at this stage, the electricity required to cause the motor generator to start the engine cannot be supplied from the high-voltage battery, leading to degradation in the startability. In view of this problem, the apparatus of Japanese Patent Laying-Open No. 2003-70103 stops the drive of the DC/DC converter when the engine is to be started by the motor generator to prevent the power output of the high-voltage battery from being drawn to the low-voltage battery. Thus, the engine startability is improved.

However, the prohibition of the drive of the DC/DC converter at the time of engine startup will result in the termination of power supply from the running-purpose battery to the subsidiary battery in accordance with the control apparatus for the hybrid vehicle disclosed in Japanese Patent Laying-Open No. 2003-70103.

In general, the power source such as the subsidiary battery and running-purpose battery has the output power altered according to the charged amount (SOC: State Of Charge) as well as the peripheral environment. Particularly, it is difficult to obviate degradation in the output power from the subsidiary battery due to the continuous driving of a large electric load such as the headlight as well as natural discharge occurring by being left over for a long period of time. At an ECU (Electronic Control Unit) that controls the engine startup upon receiving power supply from the subsidiary battery, there is the possibility of the supplied voltage from the subsidiary battery to the ECU will be lower than the ECU operating voltage.

Since the ECU will be disabled in operation in such an event, safety measures to prohibit activation of the vehicle system (system shutdown) are taken in conventional hybrid vehicles when the voltage of the subsidiary battery becomes lower than a predetermined threshold value. Thus, there was a problem that the engine cannot be started as a result of occurrence of system shutdown at the control apparatus for a hybrid vehicle set forth above.

In view of controlling the drive of a DC/DC converter, Japanese Patent Laying-Open No. 2003-70103 teaches suspension of the operation of the DC/DC converter, and Japanese Patent Laying-Open No. 2003-189401 teaches an operation in two different modes having a different target value for the output voltage.

Specifically, in the hybrid vehicle of Japanese Patent Laying-Open No. 2003-189401, the DC/DC converter activates in a low-voltage mode in which the input electricity of the high-voltage battery is converted into the voltage of 12.0 V corresponding to the level where charging of the control-directed battery of 12 V is not possible, in the case where the power generated by the motor generator is low with the engine in an idling state and the temperature of the high-voltage battery is lower than the defined lower limit temperature. Then, following activation of the DC/DC converter, the generated power is gradually increased at a rate that does not affect the idling rotation of the engine. When the generated amount of power by the motor generator is sufficiently ensured, the operation mode of the DC/DC converter is switched from the low-voltage mode to a high-voltage mode in which the input electricity of the high-voltage battery is converted into the voltage of 14.5 V corresponding to the level where charging of the control-directed battery of 12 V is possible.

Thus, the power consumed by the DC/DC converter output is compensated for by the power generated at the motor generator while ensuring stable idling rotation of the engine. As a result, the discharge from the high-voltage battery at the time of DC/DC converter activation can be suppressed to prevent the temporary voltage drop at the high-voltage battery.

However, when the DC/DC converter is operated in a low-voltage mode in the hybrid vehicle disclosed in Japanese Patent Laying-Open No. 2003-189401, the power consumed by the control computer, accessory, and subsidiary battery connected to the DC/DC converter will be restricted.

In order to ensure the running performance and drivability of the vehicle when the engine is started and attains an idling state, proper operation of all control computers and accessories is required. In the hybrid vehicle of Japanese Patent Laying-Open No. 2003-189401, all the control computers and accessories cannot operate properly when the DC/DC converter is in a low-voltage mode since power cannot be supplied stably to the control computers and accessories. There is a possibility of system shutdown.

In view of the foregoing, an object of the present invention is to provide a power supply control apparatus and method for a hybrid vehicle that can ensure engine startup while avoiding occurrence of system shutdown even in a low temperature environment.

DISCLOSURE OF THE INVENTION

According to the present invention, a power supply control apparatus for a hybrid vehicle includes a first power supply providing a first power supply voltage, a motor receiving supply of power from the first power supply to start an internal combustion engine, a voltage converter connected parallel to the motor with respect to the first power supply to voltage-convert the first power supply voltage according to a voltage control value for output between first and second power supply lines, a second power supply connected between the first and second power supply lines to output a second power supply voltage lower than the first power supply voltage, an electric load connected between the first and second power supply lines to receive voltage from at least one of the voltage converter and the second power supply, a control device receiving voltage from at least one of the voltage converter and second power supply to control startup of the internal combustion engine and voltage conversion according to designation of activation of a vehicle system, and a defect diagnosis device giving a diagnosis of a defect at the electric load based on the voltage output between the first and second power supply lines becoming lower than a lower limit of an operating voltage at which a proper operation of the electric load is ensured. The control device includes first voltage conversion control means for controlling the voltage converter by setting the voltage control value to a first voltage that is lower than the second power supply voltage and that is at least the lower limit of the operating voltage of the control device in response to a temperature of at least one of the internal combustion engine and first power supply being not more than a predetermined threshold value, defect diagnosis prohibition means for prohibiting a defect diagnosis operation of the defect diagnosis device in response to the voltage control value set to the first voltage, low temperature startup control means for controlling a drive of the motor to start the internal combustion engine in response to the temperature of at least one of the internal combustion engine and first power supply being not more than the predetermined threshold value, second voltage conversion control means for controlling the voltage converter by setting the voltage control value to a second voltage that is at least the second power supply voltage in response to completion of the startup of the internal combustion engine, and running permission means for canceling prohibition of the defect diagnosis operation of the defect diagnosis device and designating a running permission of the hybrid vehicle in response to the voltage control value being set to the second voltage.

In the case where the temperature of the internal combustion engine and first power supply is low when the vehicle system is activated according to the power supply control apparatus for a hybrid vehicle set forth above, a vehicle running permission is output in response to the startup of the internal combustion engine being completed. By driving the voltage converter to provide a voltage lower than the output voltage of the second power supply until the startup of the internal combustion engine is completed, the power required for startup of the internal combustion engine is supplied from the first power supply to the motor. In addition, power is supplied to the control device that effects startup control from the second power supply and the first power supply to compensate for the insufficient output from the second power supply. Since a defect diagnosis operation on the electric load that is not involved with startup control is temporarily prohibited, occurrence of system shutdown caused by reduction in voltage is obviated. As a result, in accordance with the power supply control apparatus of the present invention, the startability of the internal combustion engine can be improved while avoiding system shutdown even in a low temperature environment.

Preferably, the control device further includes output power estimation means for estimating the power that can be output from the first power supply based on the temperature and a state of charge of the first power supply. The first voltage conversion control means sets the voltage control value to the first voltage when the estimated power that can be output from the first power supply is lower than predetermined power required to start the internal combustion engine, and sets the voltage control value to the second voltage control value when the estimated power that can be output from the first power supply is at least the predetermined power.

According to the power supply control apparatus for a hybrid vehicle set forth above, the voltage converter is driven to output a voltage equal to or larger than the voltage output from the second power supply as long as the first power supply can output power required for the startup of the internal combustion engine, even if the internal combustion engine and the first power supply are at low temperature. As a result, the frequency of the operation of the electric load becoming unstable can be reduced in a range that does not degrade the startability.

Preferably, the first voltage conversion control means further includes required power estimation means for estimating predetermined power required to start the internal combustion engine. The required power estimation means estimates the supply power to the motor based on the temperature of the internal combustion engine, and calculates the predetermined power by adding the power consumption of the control device estimated in advance and the charging power of the second power supply to the estimated supply power to the motor.

According to the power supply control apparatus for a hybrid vehicle set forth above, power sufficient for startup of the internal combustion engine is supplied to the motor even in the case where the temperature of the internal combustion engine is low and the supply power to the motor is increased. As a result, the internal combustion engine can be started reliably.

Preferably, the first voltage conversion control means feedback-controls the voltage converter such that the output voltage matches the first voltage control value.

According to the power supply control apparatus for a hybrid vehicle set forth above, power is supplied from the first and second power supplies to the control device that effects startup control so as to compensate for the insufficient output from the second power supply. Therefore, proper operation is ensured and the internal combustion engine can be started reliably.

In addition, the present invention is directed to a power supply control method for a hybrid vehicle that includes a first power supply providing a first power supply voltage, a motor receiving supply of power from the first power supply to start an internal combustion engine, a voltage converter connected parallel to the motor with respect to the first power supply to voltage-convert the first power supply voltage according to a voltage control value for output between first and second power supply lines, a second power supply connected between the first and second power supply lines to output a second power supply voltage lower than the first power supply voltage, an electric load connected between the first and second power supply lines to receive voltage from at least one of the voltage converter and the second power supply, a control device receiving voltage from at least one of the voltage converter and second power supply to control startup of the internal combustion engine and voltage conversion according to designation of activation of a vehicle system, and a defect diagnosis device giving a diagnosis of a defect at the electric load based on the voltage output between the first and second power supply lines becoming lower than a lower limit of an operating voltage at which a proper operation of the electric load is ensured. The power supply control method includes a first step of setting a voltage control value to a first voltage that is lower than a second direct current voltage and that is at least a lower limit of an operating voltage of the control device in response to a temperature of at least one of the internal combustion engine and first power supply being not more than a predetermined threshold value, a second step of prohibiting a defect diagnosis operation of the defect diagnosis device in response to the voltage control value being set to the first voltage, a third step of feedback-controlling the voltage converter such that the output voltage matches the voltage control value, and drive-controlling the motor to start the internal combustion engine, a fourth step of feedback-controlling the voltage converter by setting the voltage control value to a second voltage that is at least the second power supply voltage in response to completion of the startup of the internal combustion engine, and a fifth step of canceling prohibition of the defect diagnosis operation of the defect diagnosis device and designating a running permission of the hybrid vehicle in response to the voltage control value being set to the second voltage.

In the case where the temperature of the internal combustion engine and first power supply is low when the vehicle system is activated according to the power supply control method for a hybrid vehicle set forth above, a vehicle running permission is output in response to the startup of the internal combustion engine being completed. By driving the voltage converter to provide a voltage lower than the output voltage of the second power supply until the startup of the internal combustion engine is completed, power sufficient to start the internal combustion engine is supplied to each of the motor and control device. Since the defect diagnosis operation on the electric load that is not involved with startup control is temporarily prohibited, occurrence of system shutdown caused by voltage reduction is obviated. As a result, the startability of the internal combustion engine can be improved while obviating system shutdown even in a low temperature environment by virtue of the power supply control method of the present invention.

Preferably, the first step includes a first substep of estimating power that can be output by the first power supply based on the temperature and the state of charge of the first power supply, a second substep of setting the voltage control value to the first voltage when the estimated power that can be output by the first power supply is lower than the predetermined power that is required to start the internal combustion engine, and a third substep of setting the voltage control value to the second voltage control value when the estimated power that can be output from the first power supply is at least the predetermined power.

According to the power supply control method for a hybrid vehicle set forth above, the voltage converter is driven such that a voltage of at least the output voltage from the second power supply is provided as long as the first power supply can output the power required for the startup of the internal combustion engine. As a result, the frequency of the operation of the electric load becoming unstable can be reduced in a range that does not degrade the startability.

According to the present invention, the engine can be started reliably while obviating occurrence of system shutdown even in a low temperature environment.

BEST MODES FOR CARRYING OUT THE INVENTION

Figure 1:
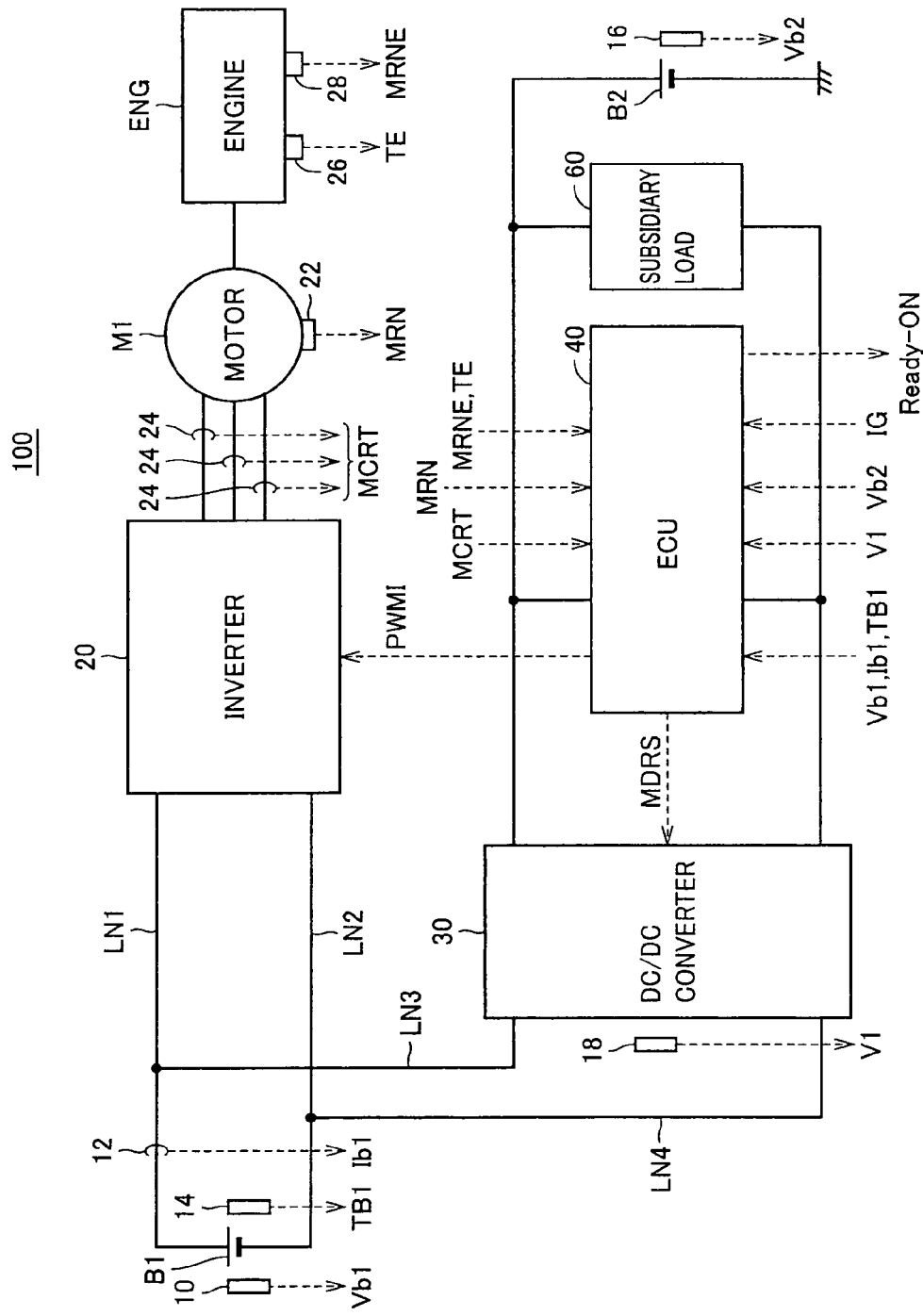
FIG. 1 is a schematic block diagram of a motor drive apparatus to which a power supply control apparatus for a hybrid vehicle is applied according to an embodiment of the present invention.

Embodiments of the present invention will be described in detail hereinafter with reference to the drawings. In the drawings, the same or corresponding elements have the same reference characters allotted.

FIG. 1 is a schematic block diagram of a motor drive apparatus to which a power supply control apparatus for a hybrid vehicle according to an embodiment of the present invention is applied.

Referring to FIG. 1, a motor drive apparatus 100 includes a main battery B1, an inverter 20, a voltage sensor 10, current sensors 12 and 24, temperature sensors 14 and 26, revolution speed sensors 22 and 28, and an ECU (Electrical Control Unit) 40.

An engine ENG generates a driving force with the burning energy of fuel such as gasoline as the source. The driving force generated by engine ENG is split into two paths by a power split mechanism not shown. One path is directed to transmission to a drive shaft that drives a wheel via a reduction gear. The other path is directed to transmission to an alternating-current motor M1.

Temperature sensor 26 detects a temperature TE (hereinafter, also referred to as engine temperature) of the lubrication oil of engine ENG, and provides the detected engine temperature TE to ECU 40. Revolution speed sensor 28 detects a revolution speed MRNE of engine ENG to provide the detected revolution speed MRNE to ECU 40.

Alternating-current motor M1 functions as a power generator driven by engine ENG, and operates as an electric motor with respect to engine ENG, i.e. a motor that can conduct engine startup.

Specifically, alternating-current motor M1 is a 3-phase alternating-current rotating machine, employed as a starter for starting engine ENG at the time of acceleration. At this stage, alternating-current motor M1 receives power supply from main battery B1 to be driven as an electric motor to crank engine ENG for startup. Revolution speed sensor 22 detects motor revolution speed MRN of alternating-current motor M1. The detected motor revolution speed MRN is output to ECU 40.

Following startup of engine ENG, alternating-current motor M1 is rotated to generated power by the driving force of engine ENG transmitted via the power split mechanism.

The power generated by alternating-current motor M1 is used selectively depending upon the running state of the vehicle and the SOC of main battery B1. For example, in a normal running mode or rapid acceleration mode, the electric power generated by alternating-current motor M1 is directly used as the power to drive the vehicle running-purpose motor (not shown) coupled to the drive shaft. When the SOC of main battery B1 is lower than a predetermined value, the power generated by alternating-current motor M1 is converted into direct current power from alternating current power by inverter 20 to be stored in main battery B1.

Main battery B1 is a running-purpose battery of high-voltage. A plurality of secondary battery cells such as nickel metal hydride cells or lithium ion cells are connected in series to constitute the high-voltage battery. Main battery B1 outputs a direct current voltage Vb1 of approximately 280 V, for example. Alternative to such secondary batteries, main battery B1 may be formed of a capacitor, condenser, or the like.

Voltage sensor 10 detects voltage Vb1 output from main battery B1, and provides the detected voltage Vb1 to ECU 40. Current sensor 12 detects a charge/discharge current Ib1 of main battery B1, which is provided to ECU 40. Temperature sensor 14 detects a temperature TB1 (hereinafter, also referred to as main battery temperature) of main battery B1, which is provided to ECU 40.

Inverter 20 is a 3-phase inverter. When direct current voltage Vb1 is supplied via power supply line LN1 and earth line LN2 from main battery B1, inverter 20 converts direct current voltage Vb1 into a 3-phase alternating voltage based on a control signal PWMI from ECU 40 to drive alternating-current motor M1. Accordingly, alternating-current motor M1 is driven to generate torque specified by a torque command value TR. Current sensor 24 detects a motor current MCRT flowing to alternating-current motor M1, and the detected motor current MCRT is provided to ECU 40.

At the time of engine startup, for example, inverter 20 converts direct current voltage Vb1 from main battery B1 into an alternating voltage according to signal PWMI to drive alternating-current motor M1 such that the torque specified by torque command value TR is output. Alternating-current motor M1 rotates the crankshaft of engine ENG via a power split mechanism not shown to start engine ENG.

Subsequent to engine startup, alternating-current motor M1 functions as a power generator to generate power by the rotation force of engine ENG. At this stage, inverter 20 converts the alternating voltage generated by alternating-current motor M1 into direct current voltage by signal PWMI. The converted direct current voltage is supplied onto power supply line LN1 and earth line LN2.

In order to allow the hybrid vehicle in which motor drive apparatus 100 of the present embodiment is incorporated to be driven according to the driver's instruction, ECU 40 controls the entire operation of the equipment/circuit group incorporated in the vehicle. Specifically, processing is applied on various information such as the driving state of the vehicle, the accelerator step-down amount, the rate of change of the accelerator step-down amount, the throttle opening position, the shift position, the state of charge of main battery B1, and the like based on a predetermined program at a CPU (Central Processing Unit), not shown, incorporated in ECU 40. Control signals corresponding to the processing results are provided to the equipment/circuit group.

By way of example, when activation of the vehicle system is requested by an operation of the ignition switch made by the driver, ECU 40 receives power supply from subsidiary battery B2 to start a relevant process.

At this stage, ECU 40 controls the voltage converting operation of DC/DC converter 30 according to output voltage Vb2 of subsidiary battery B2 from voltage sensor 16. Specifically, when output voltage Vb2 of subsidiary battery B2 is lower than a predetermined reference voltage that has been set in advance, ECU 40 operates DC/DC converter 30 to down-convert the direct current voltage from main battery B1. The down-converted voltage is supplied to ECU 40, subsidiary load 60 and subsidiary battery B2. The predetermined reference voltage is set to a level at which a proper operation of all ECU 40 and subsidiary load 60 is ensured.

When output voltage Vb2 of subsidiary battery B2 rises as high as at least the predetermined reference voltage, ECU 40 determines that there is no error in the power supply system and gives a "proper" determination as a result of the defect diagnosis, followed by an output of a signal indicating running permission of the vehicle (running permission signal) Ready-ON to display means not shown. Thus, the driver can run the vehicle.

In the series of control at the time of vehicle system activation set forth above, ECU 40 also adjusts the timing of providing a running permission signal Ready-ON according to engine temperature TE applied from temperature sensor 26 and main battery temperature TB1 applied from temperature sensor 14.

Specifically, when engine temperature TE and main battery temperature TB1 are higher than a predetermined threshold value T_th, a running permission signal Ready-ON is immediately output in response to the determination that the power supply system is in a proper state. When at least one of engine temperature TE and battery temperature TB1 is equal to or lower than predetermined threshold value T_th, a process to start engine ENG beforehand is executed by a scheme that will be described afterwards, and running permission signal Ready-ON is output in response to completion of the startup of engine ENG. Predetermined threshold value T_th in this case is set to approximately −10° C., for example.

The reason why a configuration of starting engine ENG beforehand when engine ENG and main battery B1 are at a low temperature to output running permission signal Ready-ON after engine startup is set forth below.

In the case where the vehicle is left in an arrested state for a long period of time under a low temperature environment and engine temperature TE is low, the load on alternating-current motor M1 that cranks engine ENG for the startup is increased since the viscosity of the lubricating oil is high. Therefore, a large power is required to start engine ENG. In addition, main battery B1 is significantly reduced in the power that can be output due to the low battery temperature. In a configuration where engine ENG is to be started after vehicle running is permitted, the power supplied from main battery B1 to alternating-current motor M1 will not satisfy the power level required to start engine ENG, leading to the possibility of startup defect in engine ENG. To avoid such inconvenience, a configuration is implemented in which a running permission signal Ready-ON is output after engine ENG is started in advance and warmed up, when engine temperature TE and main battery temperature TB1 are low.

When ECU 40 receives input voltage Vb1 (corresponding to the output voltage of main battery B1) of inverter 20 from voltage sensor 10, and motor current MCRT from current sensor 24 at the time of starting engine ENG through the driving force of alternating-current motor M1, a signal PWMI to control the switching of the switching element (not shown) of inverter 20 when inverter 20 drives alternating-current motor M1 is generated based on input voltage Vb1, motor current MCRT, and torque command value TR. The generated signal PWMI is provided to inverter 20.

In addition to main battery B1 of high voltage, motor drive apparatus 100 further includes a subsidiary battery B2 supplying power to subsidiary load 60 and ECU 40, a DC/DC converter 30 to down-convert the power of main battery B1 to supply the down-converted power to subsidiary battery B2, ECU 40 and subsidiary load 60, and a voltage sensor 18.

DC/DC converter 30 down-converts the direct current voltage supplied from main battery B1 via power supply lines LN1 and LN3 and earth lines LN2 and LN4 according to a signal MDRS. The down-converted direct current voltage is supplied to ECU 40, subsidiary load 60, and subsidiary battery B2. In this case, DC/DC converter 30 down-converts the input voltage of approximately 280 V, for example, into a voltage of approximately 14 V, which is supplied to ECU 40, subsidiary load 60 and subsidiary battery B2. Voltage sensor 18 detects input voltage V1 of DC/DC converter 30, which is provided to ECU 40.

Subsidiary battery B2 is a lead storage battery, for example, providing direct current voltage of approximately 12 V. Subsidiary battery B2 is charged by the direct current voltage from DC/DC converter 30. Voltage sensor 16 detects output voltage Vb2 of subsidiary battery B2, which is provided to ECU 40.

Subsidiary load 60 and ECU 40 are driven by the direct current voltage supplied from DC/DC converter 30. Subsidiary load 60 includes a lighting device, ignition device, electrical pump, air conditioner, power window, audio system, and the like, incorporated in a hybrid vehicle.

Subsidiary battery B2 supplies direct current voltage to ECU 40 and subsidiary load 60 when the power supplied from DC/DC converter 30 to ECU 40 and subsidiary load 60 is lower than the power consumed thereat. Namely, ECU 40 and subsidiary load 60 are driven by the direct current voltage supplied from DC/DC converter 30 and/or subsidiary battery B2.

At the time of vehicle system activation, ECU 40 generates a signal MDRS to control DC/DC converter 30 by a method that will be described afterwards, based on input voltage V1 from voltage sensor 18, output voltage Vb2 from voltage sensor 16, and engine temperature TE from temperature sensor 26. The generated signal MDRS is provided to DC/DC converter 30.

ECU 40 also executes a defect diagnosis operation to diagnose whether subsidiary load 60 can operate properly or not. Specifically, ECU 40 determines whether output voltage Vb2 from subsidiary battery B2 is lower than a limit value of the operating voltage at which a proper operation of subsidiary load 60 is ensured (hereinafter, also referred to as operating voltage lower limit). The operating voltage lower limit of subsidiary load 60 corresponds to a voltage level that allows proper operation of all the accessories. In the present embodiment, the operating voltage lower limit is set to approximately 11 V.

ECU 40 determines that subsidiary load 60 cannot operate properly and gives a diagnosis of a defect at subsidiary load 60 in response to output voltage Vb2 of subsidiary battery B2 being lower than the operating voltage lower limit of subsidiary load 60. In response to the diagnosis of a defect at subsidiary load 60, ECU 40 executes a process to shut down the vehicle system.

It may be thought that ECU 40 per se will be disabled in operation if output voltage Vb2 of subsidiary battery B2 is lower than the operating voltage lower limit of ECU 40. It is to be noted that the operating voltage lower limit of ECU 40 is set lower than the operating voltage lower limit of subsidiary load 60 (in the present embodiment, approximately 8 V). When output voltage Vb2 of subsidiary battery B2 becomes lower than this operating voltage lower limit, a power supply monitor circuit (not shown) incorporated in ECU 40 maintains ECU 40 at a reset state. Therefore, ECU 40 will not output an erroneous signal to subsidiary load 60.

This defect diagnosis operation is executed continuously during the period starting from activation of the vehicle system in response to an ignition operation made by the driver up to termination of the vehicle system.

The power supply control apparatus of the present invention is based on a configuration in which a defect diagnosis operation on subsidiary load 60 is temporarily prohibited until startup of engine ENG is completed in the case where at least one of engine ENG and main battery B1 is at a low temperature and a running permission signal Ready-ON is to be output after engine ENG is started, as will be described afterwards. Therefore, even if output voltage Vb2 of subsidiary battery B2 becomes lower than the operating voltage lower limit of subsidiary load 60 during startup of engine ENG, the operation of the vehicle system will continue without being shut down. Then, when prohibition is canceled in response to completion of engine startup, execution of a defect diagnosis operation is resumed.

Figure 2:
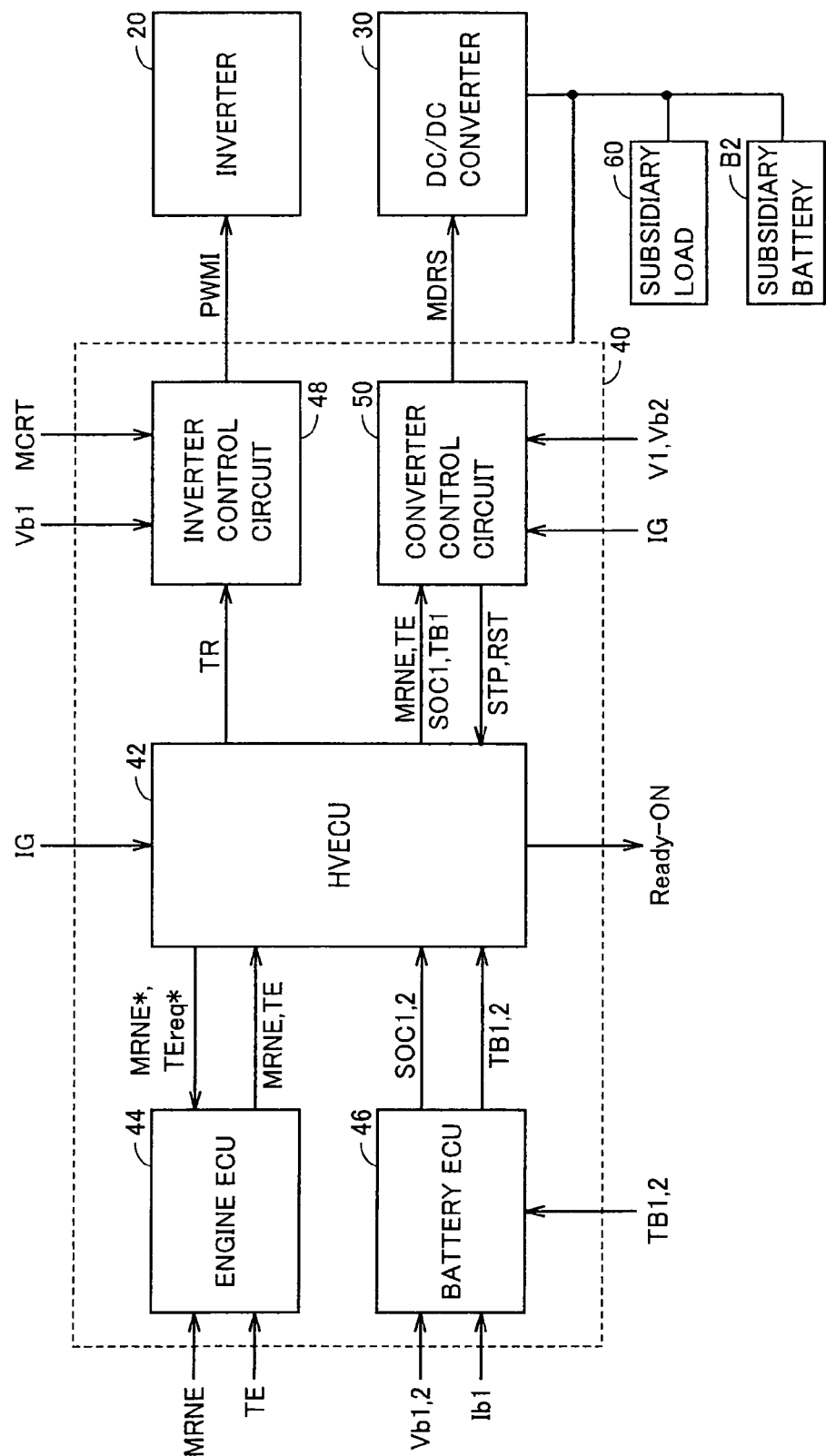
FIG. 2 is a control block diagram of an ECU of FIG. 1.

FIG. 2 is a control block diagram of ECU 40 of FIG. 1.

Referring to FIG. 2, ECU 40 includes an HVECU 42, an engine ECU 44, a battery ECU 46, an inverter control circuit 48, and a converter control circuit 50.

HVECU 42 determines the control input such as the revolution speed and torque distribution of alternating-current motor M1 and the drive-purpose motor, and supplies various request values to other ECUs and control circuits to drive engine ENG, alternating-current motor M1, and the drive-purpose motor.

Specifically, HVECU 42 receives a signal IG from an ignition sensor indicating an ignition operation, the accelerator pedal position indicating the step-down amount of the accelerator pedal from an accelerator pedal position sensor, and the shift position from a shift position sensor. HVECU 42 also receives the state of charge SOC of main battery B1 and the battery temperature from battery ECU 46. Signal IG functions to attain an H (logical high) level and an L (logical low) level in response to the ignition switch being turned on (IG-ON) and off (IG-OFF), respectively, through an operation made by the driver of the vehicle.

HVECU 42 calculates the required driving force to be output to the drive shaft of the vehicle based on the input information set forth above. According to the driving status of the vehicle, HVECU 42 determines the required power PE* of engine ENG, and the required power PM* of alternating-current motor M1 and the drive-purpose motor with respect to the required driving force. HVECU 42 sets a target revolution speed MRNE* and a target torque TEreq* of engine ENG based on required power PE*. The set target revolution speed MRNE* and target torque TEreq* are output to engine ECU 44.

HVECU 42 sets the torque command value to be applied to each of alternating-current motor M1 and the drive-purpose motor based on required power PM* and the revolution speed of alternating-current motor M1 and the drive-purpose motor from the revolution speed sensor. Torque command value TR of alternating-current motor M1 is provided to inverter control circuit 48, as shown in FIG. 2.

Engine ECU 44 controls the power (revolution speed× torque) output from engine ENG such that target revolution speed MRNE* applied from HVECU 42 matches the actual revolution speed MRNE. Engine revolution speed MRNE is fed back from engine ECU 44 to HVECU 42. Further, engine temperature TE detected at temperature sensor 26 is output to HVECU 42.

Upon receiving voltage Vb1 from voltage sensor 10, main battery temperature TB1 from the temperature sensor, and charging/discharging current Ib1 of main battery B1 from current sensor 12, battery ECU 46 estimates the state of charge SOC1 of main battery B1 based on the received input signals. Battery ECU 46 provides the estimated state of charge SOC1 of main battery B1 to HVECU 42, together with a signal indicating the state of main battery B1 (voltage Vb1, main battery temperature TB1).

Similarly for subsidiary battery B2, battery ECU 46 estimates the state of charge SOC2 of subsidiary battery B2 based on input signals of various sensors. The estimated state of charge SOC2 is provided to HVECU 42, together with a signal indicating the state of subsidiary battery B2 (voltage Vb2, subsidiary battery temperature TB2).

Inverter control circuit 48 receives torque command value TR from HVECU 42, motor current MCRT from current sensor 24, and output voltage Vb1 of main battery B1 (corresponding to the input voltage of inverter 20) from voltage sensor 10. Inverter control circuit 48 generates a signal PWMI to turn on/off the switching element of inverter 20 during the drive of alternating-current motor M1, based on torque command value TR, motor current MCRT, and output voltage Vb1. The generated signal PWMI is output to inverter 20.

Inverter control circuit 48 also generates and provides to inverter 20 signal PWMI for converting the alternating voltage generated by alternating-current motor M1 in response to the rotation of engine ENG into direct current voltage, based on torque command value TR, motor current MCRT and output voltage Vb1.

Converter control circuit 50 receives input voltage V1 of DC/DC converter 30 from voltage sensor 13, and output voltage Vb2 of subsidiary battery B2 from voltage sensor 16. Converter control circuit 50 also receives a state of charge SOC1 and main battery temperature TB1 of main battery B1 from HVECU 42, as well as engine temperature TE and engine revolution speed MRNE. HVECU 42 receives signal IG from an ignition sensor not shown.

Converter control circuit 50 generates a signal MDRS directed to turning on/off the switching element of DC/DC converter 30 by a method that will be described afterwards, based on the input signals. The generated signal MDRS is provided to DC/DC converter 30.

Converter control circuit 50 responds to the transition of signal IG from an L level to an H level, i.e. the activation of the vehicle system, to generate a signal STP directed to prohibiting a defect diagnosis operation on subsidiary load 60 by a method that will be described afterwards, based on engine temperature TE, main battery temperature TB1, and state of charge SOC1 of main battery B1. The generated signal STP is provided to HVECU 42.

Further, converter control circuit 50 generates a signal RST directed to canceling the prohibition of a defect diagnosis operation on subsidiary load 60 when determination is made that the startup of engine ENG is completed based on engine revolution speed MRNE, after signal STP is output. The generated signal RST is provided to HVECU 42.

Figure 3:
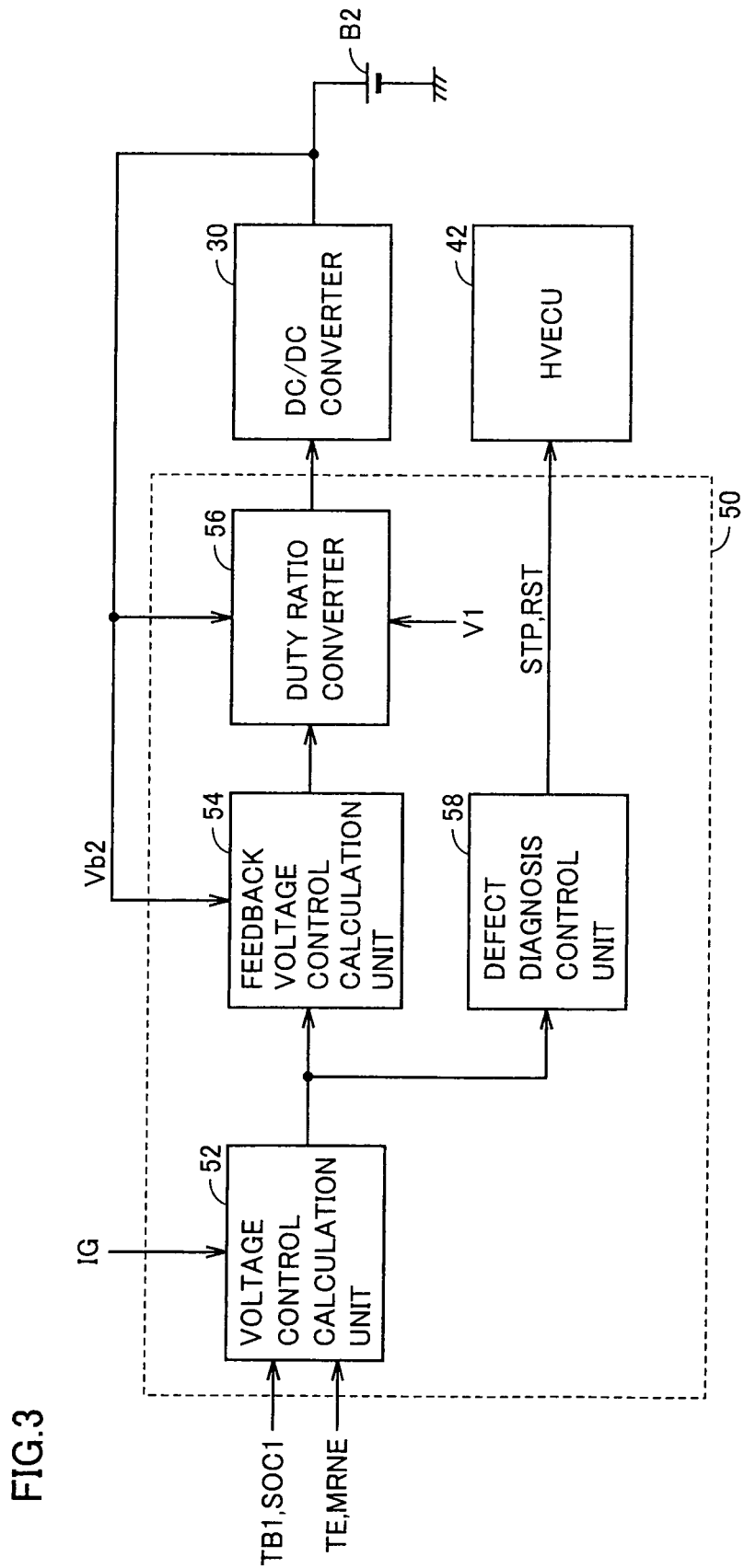
FIG. 3 is a functional block diagram of a converter control circuit of FIG. 2.

FIG. 3 is a functional block diagram of converter control circuit 50 of FIG. 2.

Referring to FIG. 3, converter control circuit 50 includes a voltage control calculation unit 52, a feedback voltage control calculation unit 54, a duty ratio converter 56, and a defect diagnosis control unit 58.

Voltage control calculation unit 52 receives engine temperature TE, engine revolution speed MRNE, main battery temperature TB1, and state of charge SOC1 of main battery TB1 from HVECU 42, and signal IG from the ignition switch.

Voltage control calculation unit 52 responds to the determination of activation of the vehicle system according to signal IG being driven to an H level from an L level to select an operation mode for DC/DC converter 30 based on engine temperature TE, main battery temperature TB1 and state of charge SOC1, and sets a target value of the output voltage, i.e. a voltage control value, of DC/DC converter 30 so as to suit the selected operation mode. The set voltage control value is provided to feedback voltage control calculation unit 54 and defect diagnosis control unit 58.

Specifically, the operation mode of DC/DC converter 30 at the time of vehicle system activation includes a "high-voltage mode" that sets the voltage control value to a relatively high value, and a "low-voltage mode" that sets the voltage control value to a relatively low value.

In a high-voltage mode, the voltage control value corresponds to a voltage level equal to or higher than output voltage Vb2 (approximately 12 V) of subsidiary battery B2, and is set to approximately 14 V, for example. This is for the purpose of charging subsidiary battery B2 by the drive of DC/DC converter 30.

In a low-voltage mode, the voltage control value corresponds to a voltage level lower than output voltage Vb2 of subsidiary battery B2, and is set to approximately 10.5 V, for example. It is to be noted that this voltage control value is set to be equal to or higher than the operating voltage lower limit (approximately 8 V) of ECU 40. This is to prevent ECU 40 from being disabled in operation.

Voltage control calculation unit 52 selects one of the high-voltage mode and low-voltage mode set forth above, according to engine temperature TE and main battery temperature TB1.

Specifically, voltage control calculation unit 52 selects a high-voltage mode when engine temperature TE and main battery temperature TB1 are higher than a predetermined threshold value T_th (approximately −10° C.). Then, voltage control calculation unit 52 provides a voltage control value of 14.0 V corresponding to the high-voltage mode to feedback voltage control calculation unit 54 and defect diagnosis control unit 58.

In contrast, voltage control calculation unit 52 selects a low-voltage mode when at least one of engine temperature TE and main battery temperature TB1 is equal to or below predetermined threshold value T_th. Then, voltage control calculation unit 52 provides a voltage control value of 10.5 V corresponding to the low-voltage mode to feedback voltage control calculation unit 54 and defect diagnosis control unit 58.

Feedback voltage control calculation unit 54 calculates a feedback voltage control value based on output voltage Vb2 of subsidiary battery B2 from voltage sensor 16 and the voltage control value from voltage control calculation unit 52. The calculated feedback voltage control value is provided to duty ratio converter 56.

Duty ratio converter 56 calculates a duty ratio directed to setting output voltage Vb2 from voltage sensor 16 to the feedback voltage control value from feedback voltage control calculation unit 54, based on input voltage V1 of DC/DC converter 30 from voltage sensor 18, output voltage Vb2 from voltage sensor 16, and the feedback voltage control value from feedback voltage control calculation unit 54. A signal MDRS directed to turning on/off the switching element of DC/DC converter 30 based on the calculated duty ratio is generated. Duty ratio converter 56 provides the generated signal MDRS to the switching element of DC/DC converter 30.

Thus, converter control circuit 50 feedback-controls DC/DC converter 30 such that output voltage Vb2 of DC/DC converter 30 matches the voltage control value. Accordingly, a direct current voltage of approximately 14 V is output from DC/DC converter 30 in a high-voltage mode to be supplied to ECU 40, subsidiary load 60, and subsidiary battery B2.

In a low-voltage mode, the duty ratio is forced to be set to zero at duty ratio converter 56 since output voltage Vb2 (approximately 12 V) is higher than the voltage control value (approximately 10.5 V). Accordingly, the on/off operation of the switching element is suspended, and DC/DC converter 30 attains a drive-suspended state. As a result, subsidiary battery B2 supplies the power that will be consumed at ECU 40 and subsidiary load 60 since power supply from DC/DC converter 30 to ECU 40 and subsidiary load 60 is cut off in a low-voltage mode.

Eventually, when the output power of subsidiary battery B2 is, reduced such that output voltage Vb2 becomes lower than the voltage control value (approximately 10.5 V), converter control circuit 50 executes feedback-control such that output voltage Vb2 of DC/DC converter 30 matches the voltage control value. Accordingly, a direct current voltage of approximately 10.5 V is output from DC/DC converter 30. As a result, the insufficient amount of power consumed at ECU 40 and subsidiary load 60 is supplied from DC/DC converter 30.

Upon receiving engine revolution speed MRNE from revolution speed sensor 28 when the low-voltage mode is selected, voltage control calculation unit 52 executes a comparison operation of whether engine revolution speed MRNE matches a predetermined revolution speed that is set in advance (for example, in the vicinity of the idling revolution speed) to determine whether engine ENG is in a full combustion state based on the comparison result. If engine revolution speed MRNE is at least a predetermined revolution speed at this stage, voltage control calculation unit 52 determines that engine ENG is in a full combustion state and determines that engine startup has been completed.

Voltage control calculation unit 52 responds to the determination that engine startup has been completed to switch the operation mode of DC/DC converter 30 to a high-voltage mode from a low-voltage mode. Then, a newly set voltage control value (approximately 14.0 V) is output to feedback voltage control calculation unit 54 and defect diagnosis control unit 58.

Defect diagnosis control unit 58 generates and provides to HVECU 42 a signal STP to prohibit a defect diagnosis operation on subsidiary load 60 according to the level of the voltage control value applied from voltage control calculation unit 52.

Specifically, when the voltage control value is 10.5 V, i.e. when the operation of DC/DC converter 30 is set to a low-voltage mode, defect diagnosis control unit 58 generates and provides signal STP to HVECU 42. In response, HVECU 42 suspends the defect diagnosis operation on subsidiary load 60. Thus, even when output voltage Vb2 of subsidiary battery B2 is lower than the operating voltage lower limit (approximately 11 V) of subsidiary load 60 in a low-voltage mode, the event of the vehicle system being shut down as a result of a defect diagnosis on subsidiary load 60 can be obviated.

Then, when the voltage control value is switched from 10.5 V to 14.0 V, i.e. when the operation mode of DC/DC converter 30 is switched from a low-voltage mode to a high-voltage mode in accordance with the completion of engine startup, subsequent to an output of signal STP, defect diagnosis control unit 58 discontinues generation of signal STP, and generates a signal RST to cancel the prohibition of the defect diagnosis operation. Signal RST is output to HVECU 42. Thus, the defect diagnosis operation by HVECU 42 is temporarily suspended during the period where the low-voltage mode is selected.

Thus, the power supply control apparatus of the present invention is based on a first characteristic configuration in which DC/DC converter 30 is driven according to one of a high-voltage mode and low-voltage mode based on engine temperature TE and battery temperature TB1 during the period from activation of the vehicle system up to output of running permission signal Ready-ON.

The power supply control apparatus of the present invention is also based on a second characteristic configuration in which the defect diagnosis operation on subsidiary load 60 is temporarily suspended during the period where the operation mode of DC/DC converter 30 is set to the low-voltage mode during the period set forth above.

By implementing the characteristic configurations set forth above, the power supply control apparatus of the present invention can ensure startup of engine ENG while avoiding occurrence of system shutdown.

The advantages provided by the first and second characteristic configurations set forth above will be described in detail hereinafter based on a comparison with a conventional power supply control apparatus.

First, the advantage provided by the first characteristic configuration in the power supply control apparatus of the present invention will be described.

Figure 4:
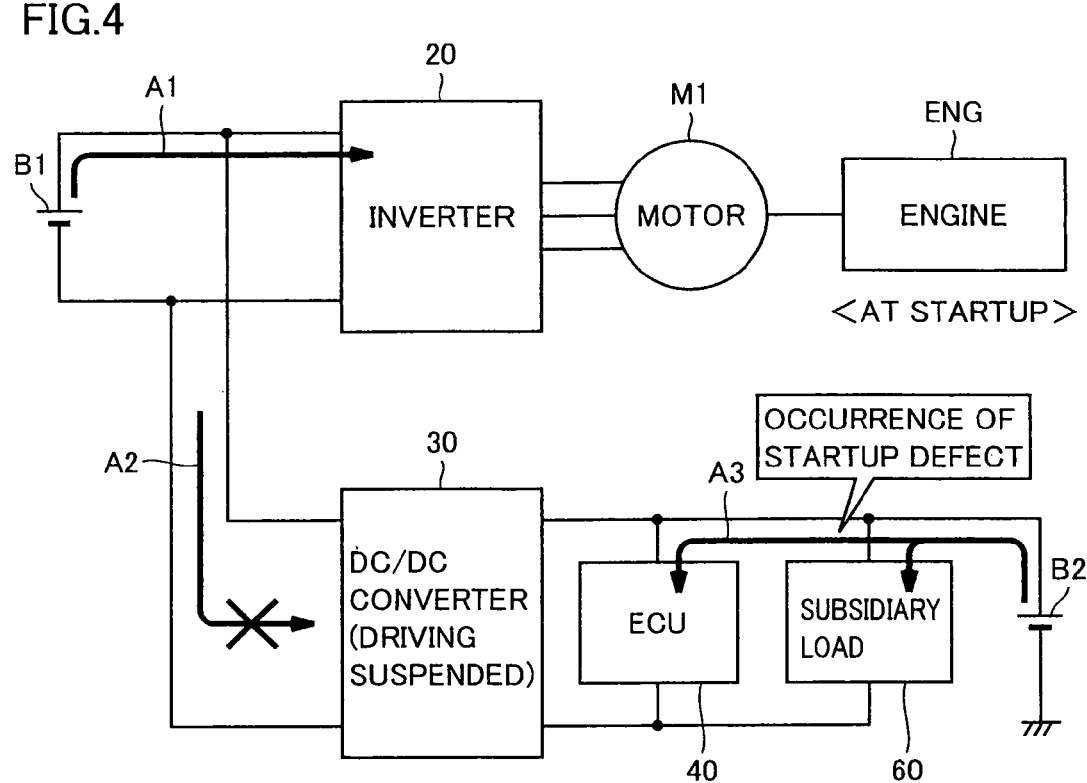
FIG. 4 is a diagram to describe the flow of power at the time of engine startup in a control apparatus for a hybrid vehicle disclosed in Japanese Patent Laying-Open No. 2003-70103.
Figure 5:
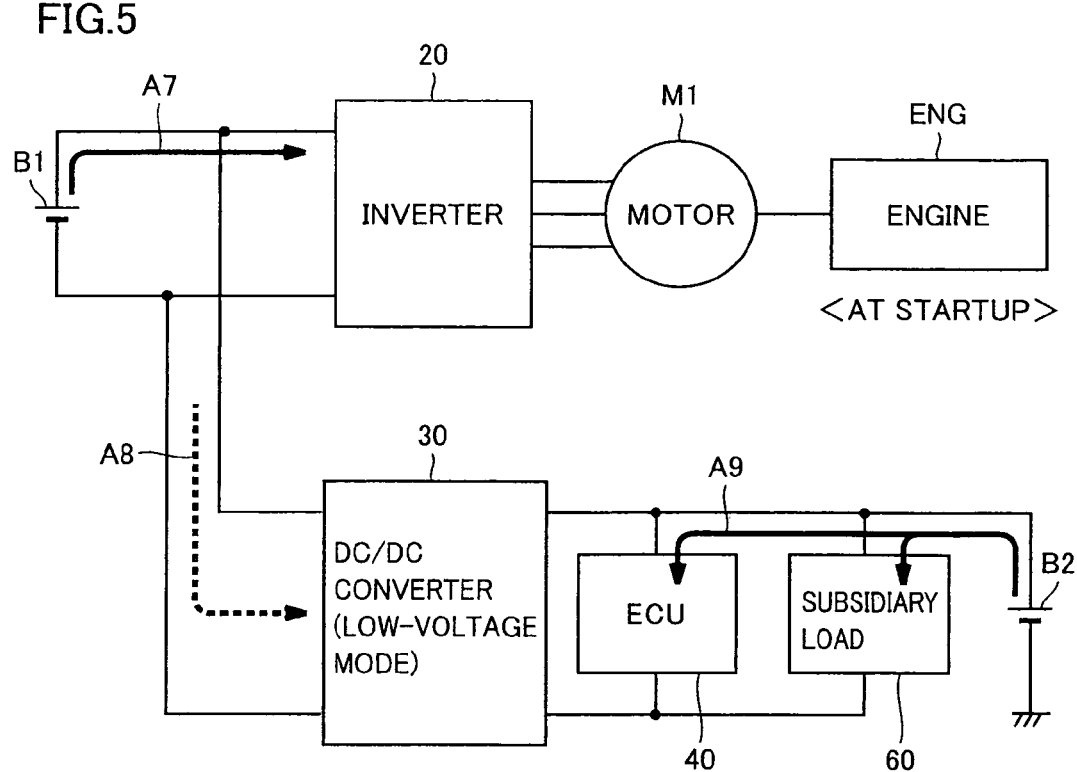
FIG. 5 is a diagram to describe the flow of power at the time of engine startup in a power supply control apparatus of the present invention.

FIG. 4 is a diagram to describe the flow of power at the time of engine startup in a control apparatus for a hybrid vehicle disclosed in Japanese Patent Laying-Open No. 2003-70103. FIG. 5 is a diagram to describe the flow of power at the time of engine startup in a power supply control apparatus of the present invention.

Referring to FIG. 4, the control apparatus of the hybrid vehicle disclosed in Japanese Patent Laying-Open No. 2003-70103 suspends the drive of DC/DC converter 30 when control of automatic startup of engine ENG is to be effected by applying a driving force to engine ENG through alternating-current motor M1. Therefore, all the power from main battery B1 is supplied to alternating-current motor M1 via inverter 20, as indicated by arrow A1 in the drawing. Thus, the event of the power of main battery B1 being drawn to subsidiary battery B2 by DC/DC converter 30 at the time of engine startup can be obviated.

Power supply from main battery B1 to ECU 40 and subsidiary load 60 is cut, as indicated by arrow A2 in the drawing. Therefore, ECU 40 and subsidiary load 60 receive power supply from subsidiary battery B2 to be driven, as indicated by arrow A3 in the drawing.

There may be the case where the power that can be output from subsidiary battery B2 becomes lower than the battery consumed at ECU 40 and subsidiary load 60 since the power that can be output from subsidiary battery B2 will be reduced significantly due to reduction in the battery temperature and state of charge. In such a case, proper operation of ECU 40 that controls the drive of alternating-current motor M1 cannot be ensured by the configuration corresponding to FIG. 4 in which only subsidiary battery B2 serves as the power supply source. There is a possibility that engine ENG cannot be started properly.

The power supply control apparatus of the present invention can ensure a proper operation of ECU 40 while supplying power required to alternating-current motor M1 by operating DC/DC converter 30 at a low-voltage mode, as shown in FIG. 5.

In the case where DC/DC converter 30 is operated in a low-voltage mode, DC/DC converter 30 will attain a drive-suspended state by the function of feedback control if output voltage Vb2 of subsidiary battery B2 is higher than the voltage control value (approximately 10.5 V). Therefore, all the power output from main battery B1 will be supplied to alternating-current motor M1 via inverter 20, as indicated by arrow A7 in the drawing. At this stage, the power that will be consumed at ECU 40 and subsidiary load 60 is supplied by subsidiary battery B2, as indicated by arrow A9 in the drawing.

When the output power from subsidiary battery B2 is reduced such that output voltage Vb2 becomes lower than the voltage control value (approximately 10.5 V), DC/DC converter 30 is subjected to feedback-control to initiate its operation. Specifically, DC/DC converter 30 down-converts the direct current voltage of approximately 280 V supplied from main battery B1 to approximately 10.5 V for output. Thus, the power path indicated by arrow A8 in the drawing is established, and power is supplied from DC/DC converter 30 to ECU 40 and subsidiary load 60.

It is to be noted that subsidiary battery B2 is not charged since output voltage Vb2 of subsidiary battery B2 is maintained at approximately 10.5 V. Therefore, DC/DC converter 30 will compensate for only the insufficient power consumption of ECU 40 and subsidiary load 60. Thus, the inconvenience of significant reduction in the power supplied from main battery B1 to alternating-current motor M1 will not occur.

Figure 6:
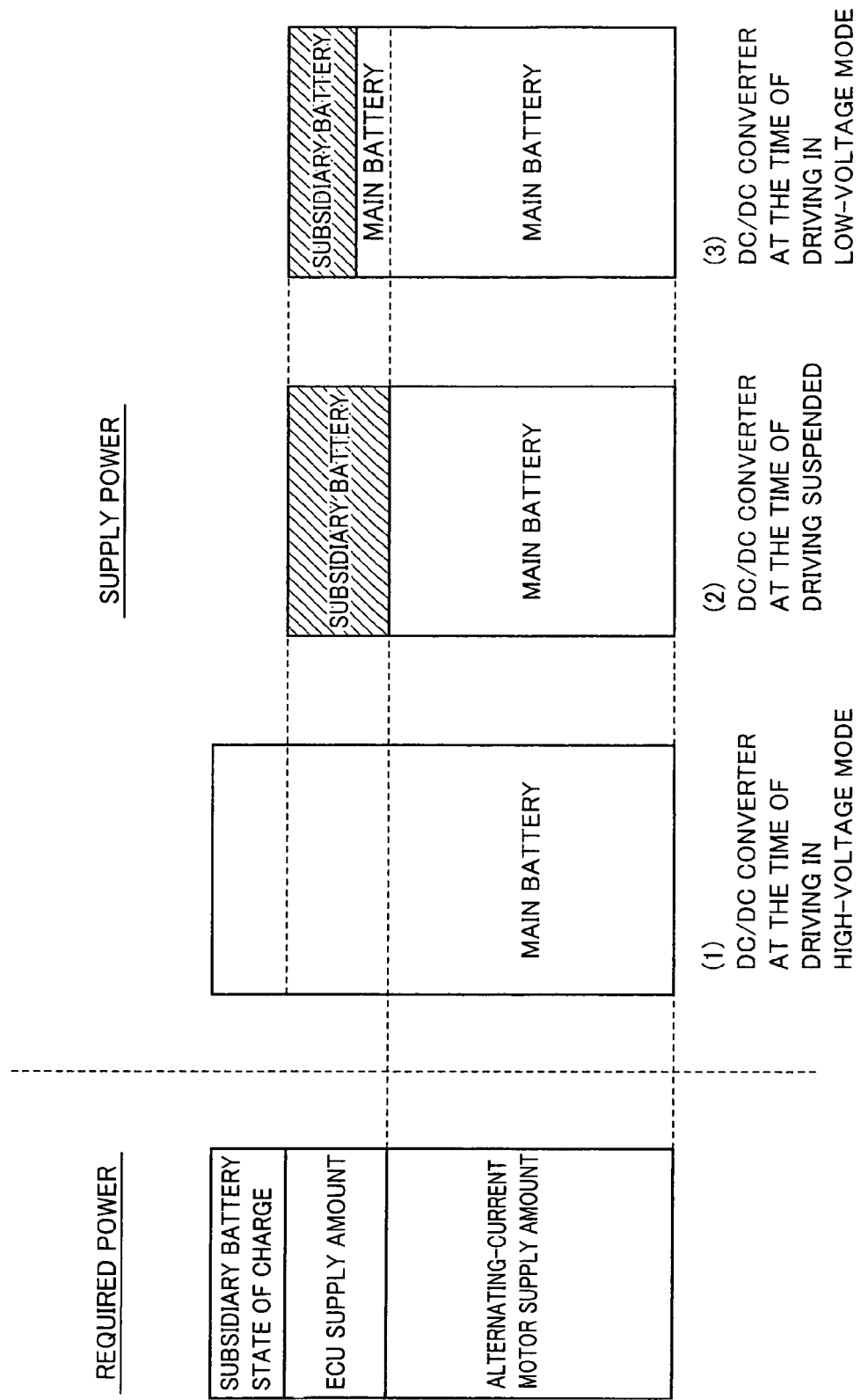
FIG. 6 is a diagram to schematically describe the relationship between the power required for engine startup and the supply-power from the main battery and subsidiary battery.

FIG. 6 is a diagram to schematically describe the relationship between the power required for engine startup and the supply power from main battery B1 and subsidiary battery B2.

Referring to FIG. 6, the power required for engine startup is based on the sum of the supply power to alternating-current motor M1, the supply power to ECU 40, and the charging power of subsidiary battery B2. The level of each power is estimated in advance based on experiments or calculations.

With regards to the required power, the power supply from main battery B1 and subsidiary battery B2 is effected according to distribution differing from each other based on the operation mode of DC/DC converter 30.

In detail, when DC/DC converter 30 is operated in a high-voltage mode corresponding to (1) in the drawing, all the power required for engine startup is supplied from main battery B1. It is therefore appreciated that the high-voltage mode is effective when the power that can be output from main battery B1 sufficiently satisfies the power required for engine startup.

In the case where the drive of DC/DC converter 30 is suspended as indicated in the conventional example of FIG. 4, the power supply to alternating-current motor M1 will be covered by main battery B1 while the power supply to ECU 40 will be covered entirely by subsidiary battery B2, corresponding to (2) in the drawing.

The power of main battery B1 is effectively used only for the drive of alternating-current motor M1. There is a possibility that the startup of engine ENG is disallowed by the reduction in the output performance of subsidiary battery B2 since subsidiary battery B2 alone becomes the power supply source towards ECU 40 and subsidiary load 60.

In the case where DC/DC converter 30 is operated in a low-voltage mode, the power of main battery B1 is mainly used for the drive of alternating-current motor M1, corresponding to (3) in the drawing. When output voltage Vb2 of subsidiary battery B2 becomes lower than the voltage control value (approximately 10.5 V), DC/DC converter 30 will be driven, so that the insufficient power supply to ECU 40 is compensated for by the power from main battery B1.

According to the power supply control apparatus of the present invention, a proper operation of ECU 40 that controls engine startup is ensured while supplying the required power for engine startup to alternating-current motor M1. Therefore, engine ENG can be started properly.

The advantage provided by the second characteristic configuration in the power supply control apparatus of the present invention will be described hereinafter.

Referring to FIG. 5 again, the supply from subsidiary battery B2 with respect to the power consumption at ECU 40 and subsidiary load 60 in the case where DC/DC converter 30 is operated at a low-voltage mode causes reduction in output voltage Vb2 of subsidiary battery B2 from the general level of approximately 12 V. The output voltage takes the level of approximately 10.5 V that corresponds to the voltage control value as the lower limit.

At this stage, when output voltage Vb2 of subsidiary battery B2 becomes lower than the operating voltage lower limit (approximately 11 V) of subsidiary load 60, HVECU 42 in ECU 40 determines that a proper operation of subsidiary load 60 is not allowed to give a defect diagnosis on subsidiary load 60. A process to shut down the vehicle system is executed.

Meanwhile, output voltage Vb2 of subsidiary battery B2 is still higher than the operating voltage lower limit (approximately 8 V) of ECU 40. Accordingly, a proper operation of ECU 40 per se is allowed. Therefore, the series of control for engine startup can be effected appropriately.

It can be said that the necessity of requiring a proper operation of subsidiary load 60 is low during the period starting from activation of the vehicle system up to an output of a running permission signal Ready-ON since the involvement of subsidiary load 60 in the control of engine ENG startup is low. In other words, determination is made that engine startup can be carried out properly as long as ECU 40 can operate properly, even in the event of a defect at subsidiary load 60. However, a proper operation of subsidiary load 60 must be ensured after the output of running permission signal Ready-ON for the purpose of reliable vehicle running performance and drivability.

In view of the foregoing, the power supply control apparatus of the present invention is based on a configuration in which a defect diagnosis operation on subsidiary load 60 is prohibited in association with DC/DC converter 30 being operated in a low-voltage mode during the period starting from activation of the vehicle system up to an output of a running permission signal Ready-ON.

Thus, the event of the vehicle system being shut down as a result of the diagnosis of a defect at subsidiary load 60 that is not involved with the startup of engine ENG, caused by reduction in output voltage Vb2 of subsidiary battery B2, can be obviated.

When the operation mode of DC/DC converter 30 is switched from a low-voltage mode to a high-voltage mode in response to the completion of engine startup, the prohibition of the defect diagnosis operation on subsidiary load 60 is canceled. Then, when running permission signal Ready-ON is output and the vehicle attains a runnable state, a proper operation of subsidiary load 60 is ensured since output voltage Vb2 of subsidiary battery B2 is maintained at a level above the operating voltage lower limit of subsidiary load 60. Moreover, the defect diagnosis operation on subsidiary load 60 by ECU 40 is also carried out.

Figure 7:
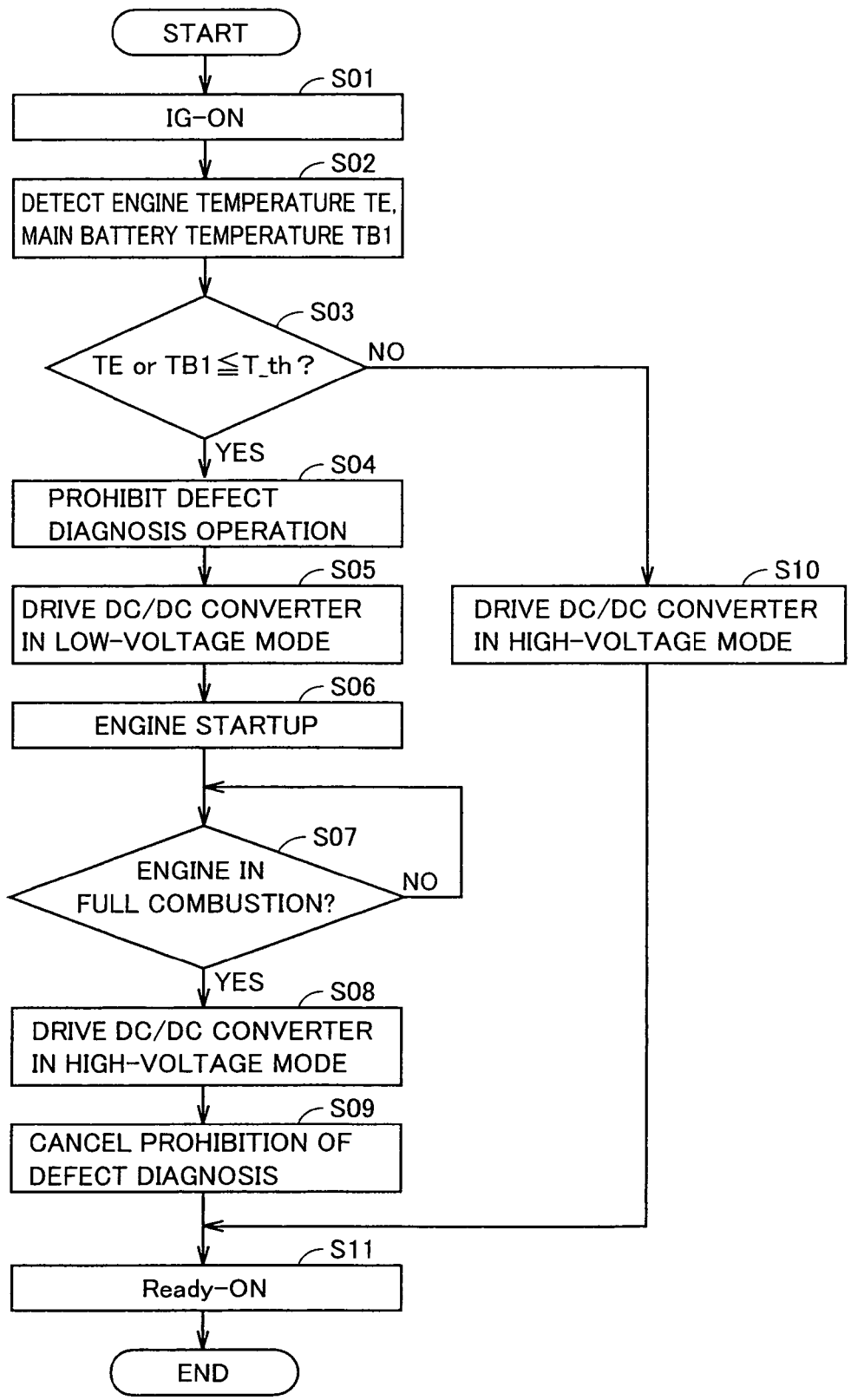
FIG. 7 is a flowchart to describe power supply control at the time of vehicle system activation in a power supply control apparatus according to the present invention.

FIG. 7 is a flowchart to describe power supply control at the time of vehicle system activation by the power supply control apparatus of the present invention.

Referring to FIG. 7, in response to the ignition switch being operated to the ON position (IG-ON) by the driver to activate the vehicle system (step S01), ECU 40 receives power supply from subsidiary battery B2 to initiate the series of processes to output vehicle running permission signal Ready-ON.

Specifically, converter control circuit 50 in ECU 40 receives engine temperature TE from temperature sensor 26 and main battery temperature TB1 from battery ECU 46 (step S02).

Converter control circuit 50 first determines whether each of engine temperature TE and main battery temperature TB1 is equal to or lower than predetermined threshold value T_th (step S03).

When determination is made that engine temperature TE and main battery temperature TB1 are higher than predetermined threshold value T_th at step S03, converter control circuit 50 sets the operation mode of DC/DC converter 30 to a high-voltage mode. Then, converter control circuit 50 sets the voltage control value of DC/DC converter 30 to a voltage corresponding to a high-voltage mode (approximately 14.0 V), and executes feedback-control on DC/DC converter 30 such that the output voltage matches the voltage control value (step S10). HVECU 42 determines that the power supply system is proper, and provides running permission signal Ready-ON to display means not shown (step S11).

When determination is made that at least one of engine temperature TE and main battery temperature TB1 is equal to or below predetermined threshold value T_th at step S03, converter control circuit 50 sets the operation mode of DC/DC converter 30 to a low-voltage mode. Converter control circuit 50 generates signal STP to prohibit the defect diagnosis operation on subsidiary load 60, and provides the generated signal STP to HVECU 42 (step S04). Thus, HVECU 42 stops the defect diagnosis operation on subsidiary load 60.

In addition, converter control circuit 50 feedback-controls DC/DC converter 30 such that the voltage control value of DC/DC converter 30 is set to a voltage level (approximately 10.5 V) corresponding to a low-voltage mode, and the output voltage matches the voltage control value (step S05). At this stage, the insufficient amount of power consumed at ECU 40 and subsidiary load 60 is supplied from DC/DC converter 30 according to reduction in output voltage Vb2 from subsidiary battery B2.

Inverter control circuit 48 effects the drive-control of inverter 20 such that alternating-current motor M1 generates a driving force required for engine startup. Accordingly, alternating-current motor M1 receives power supply from main battery B1 to be driven for engine ENG startup (step S06).

Then, converter control circuit 50 determines whether an engine full combustion state is attained or not based on engine revolution speed MRNE from revolution speed sensor 28 (step S07). This process is repeatedly executed until determination is made of an engine full combustion state. When determination is made of an engine full combustion state, converter control circuit 50 determines that engine startup has been completed, and switches the operation mode of DC/DC converter 30 from a low-voltage mode to a high-voltage mode (step S08). Accordingly, DC/DC converter 30 down-converts the direct current voltage from main battery B1 to approximately 14.0 V and supplies the down-converted voltage to ECU 40 and subsidiary load 60, and also charges subsidiary battery B2.

In addition, converter control circuit 50 generates signal RST directed to canceling the prohibition of a defect diagnosis operation on subsidiary load 60 set at step S04. The generated signal RST is output to HVECU 42 (step S09).

Finally, HVECU 42 determines that the power supply system is in a proper state according to DC/DC converter 30 operating in a high-voltage mode, and provides running permission signal Ready-ON to display means not shown (step S11).

According to an embodiment of the present invention, the engine is started in advance and the drive of the vehicle is permitted in response to completion of engine startup in the case where the temperature of at least one of the engine and main battery is at low temperature at the time of vehicle system activation. At this stage, the drive of the DC/DC converter at a low-voltage mode until engine startup is completed allows the power required for engine startup to be supplied to the alternating-current motor from the main battery. Furthermore, since power is supplied from the subsidiary battery and main battery so as to compensate for the insufficient output from the subsidiary battery for the ECU that effects engine startup control, the event of the ECU being disabled in operation can be prevented.

Furthermore, by temporarily suspending the defect diagnosis operation on the subsidiary load that is not involved with engine startup during the period where the DC/DC converter is driven in a low-voltage mode, the event of the vehicle system being shut down due to a defect at the subsidiary load can be obviated.

According to the power supply control apparatus of the present invention, the engine startability can be improved while avoiding system shutdown even in a low temperature environment.

[Modification]

In the present invention, power supply control at the time of vehicle system activation may be carried out according to the flowchart corresponding to the modification set forth below.

Figure 8:
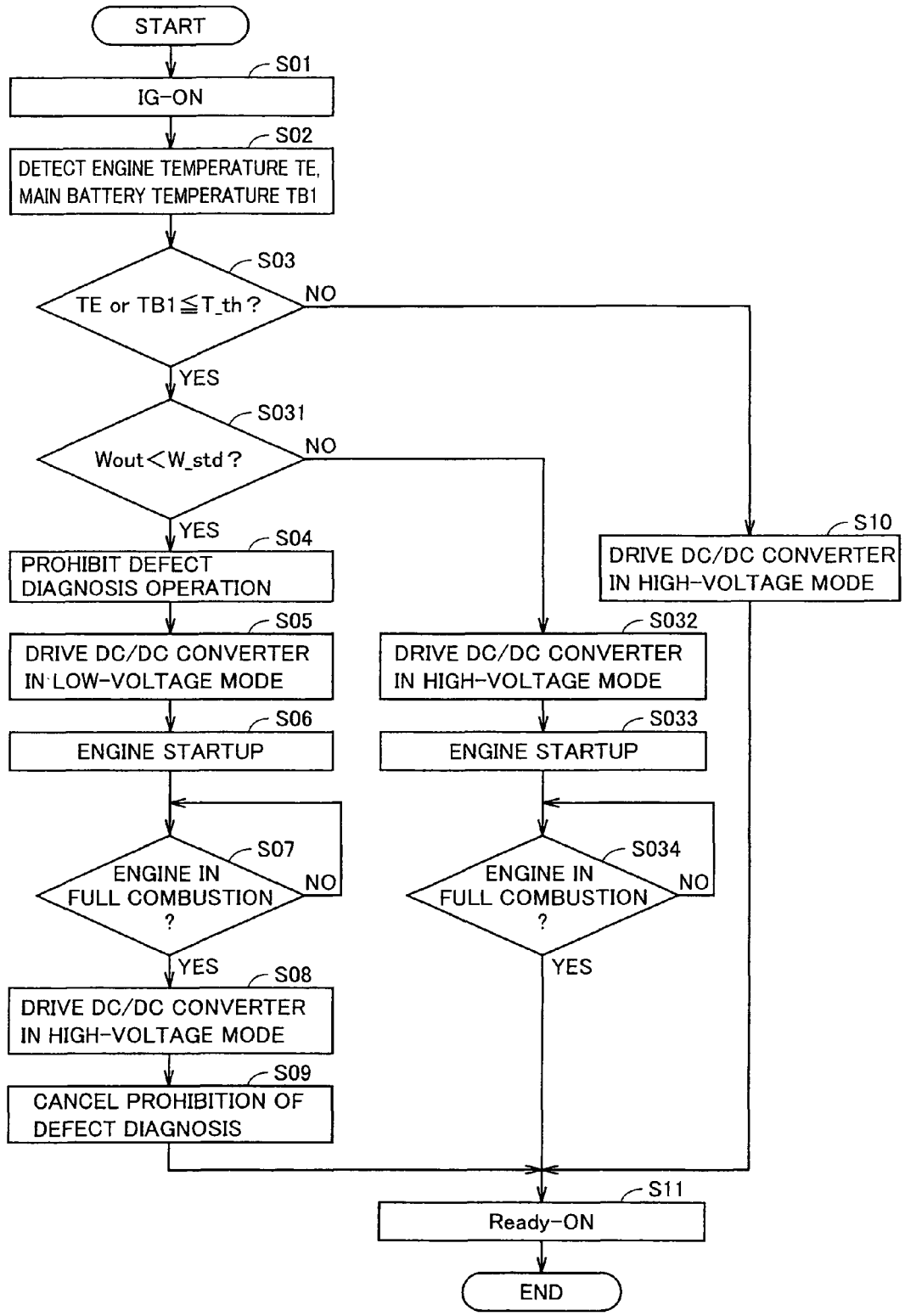
FIG. 8 is a flowchart to describe power supply control at the time of vehicle system activation in a power supply control apparatus according to a modification of the present invention.

FIG. 8 is a flow chart to describe power supply control at the time of vehicle system activation according to a modification of a power supply control apparatus of the present invention.

The flow chart of FIG. 8 is similar to the flowchart of FIG. 7 with the exception that step S031 is inserted between step S03 and step S04, and steps S032-S034 are additionally provided.

Referring to FIG. 8, when determination is made that engine temperature TE and main battery temperature TB1 are equal to or below predetermined threshold value T_th at step S03, converter control circuit 50 determines whether power Wout that can be output from main battery B1 is lower than power W_std required for engine startup (step S031).

In this determination, converter control circuit 50 estimates power Wout that can be output from main battery B1 based on main battery temperature TB1 and state of charge SOC1. The estimation of power Wout that can be output is made based on the relationship of main battery temperature TB1 and state of charge SOC1 with power Wout that can be output obtained in advance.

Furthermore, converter control circuit 50 estimates power W_std required for engine startup. Estimation of power W_std required for engine startup is made by estimating the supply power to alternating-current motor M1 based on engine temperature TE, as shown in FIG. 6, and adding the supply power to ECU 40 and the charging power of subsidiary battery B2 obtained in advance to the estimated power.

Converter control circuit 50 compares the magnitude between the levels of power Wout that can be output from main battery B1 and power W_std required for engine startup. When determination is made that power Wout of main battery B1 is lower than power W_std required for engine startup, converter control circuit 50 sets the operation mode of DC/DC converter 30 to a low-voltage mode. Then, control proceeds to step S04 where the defect diagnosis operation on subsidiary load 60 is prohibited and DC/DC converter 30 is driven at a low-voltage mode (steps S04, S05).

In contrast, when determination is made that power Wout that can be output from main battery B1 is equal to or higher than power W_std required for engine startup at step S031, converter control circuit 50 sets the operation mode of DC/DC converter 30 at a high-voltage mode. Then, converter control circuit 50 effects feedback-control on DC/DC converter 30 such that the output voltage matches the voltage control value (approximately 14.0 V) (step S032).

Then, inverter control circuit 48 effects driving-control of inverter 20 such that alternating-current motor M1 generates a driving force required for engine startup. Accordingly, alternating-current motor M1 receives power supply from main battery B1 to be driven to start engine ENG (step S033).

Then, HVECU 42 determines whether a full combustion state of the engine is achieved or not based on engine revolution speed MRNE from revolution speed sensor 28 (step S034). When determination is made that an engine full combustion state is achieved, HVECU 42 outputs running permission signal Ready-ON to the display means (step S11).

According to the present modification corresponding to FIG. 8, DC/DC converter 30 operates in a low-voltage mode only when at least one of engine temperature TE and main battery temperature TB1 is equal to or lower than predetermined threshold value T_th and main battery B1 cannot output power required for engine startup. In other words, DC/DC converter 30 operates in a high-voltage mode even if one of engine temperature TE and main battery TB1 is equal to or below the predetermined threshold value as long as main battery B1 can output the power required for engine startup.

The above-described configuration in which the operation mode of DC/DC converter 30 is set according to the output performance of main battery B1, in addition to the temperature of engine ENG and main battery B1, is intended to reduce the possibility of the operation of subsidiary load 60 becoming unstable by reducing the frequency of DC/DC converter 30 operating in a low-voltage mode within a range that does not degrade the startability of engine ENG.

In other words, output voltage Vb2 of subsidiary battery B2 is reduced from the general level of approximately 12 V down to approximately 10.5 V that is equal to the voltage control value, by causing DC/DC converter 30 to operate in a low-voltage mode. In accordance with the reduction of output voltage Vb2 at this stage, there is a possibility of inconvenience such as the brightness of the headlight being reduced or the audio being reset. Such inconveniences may bother the driver of the vehicle.

The present modification is directed to keeping down the frequency of such inconvenience as much as possible to relieve the driver from disturbance by driving DC/DC converter 30 at a high-voltage mode as long as the power required for engine startup can be output from main battery B1 even when engine ENG and main battery B1 are at a low temperature.

It should be understood that the embodiments disclosed herein are illustrative and non-restrictive in every respect. The scope of the present invention is defined by the terms of the claims, rather than the description above, and is intended to include any modification within the scope and meaning equivalent to the terms of the claims.

INDUSTRIAL APPLICABILITY

The present invention can be applied to a power supply control apparatus for a hybrid vehicle, and a hybrid vehicle incorporating said power supply control apparatus.

The invention claimed is:

1. A power supply control apparatus for a hybrid vehicle, comprising:
a first power supply providing a first power supply voltage,
a motor receiving supply of power from said first power supply to start an internal combustion engine,
a voltage converter connected parallel to said motor with respect to said first power supply to voltage-convert said first power supply voltage according to a voltage control value for output between first and second power supply lines,
a second power supply connected between said first and second power supply lines, providing a second power supply voltage that is lower than said first power supply voltage,
an electric load connected between said first and second power supply lines to receive voltage from at least one of said voltage converter and said second power supply,
a control device receiving voltage from the at least one of said voltage converter and said second power supply to control startup of said internal combustion engine and said voltage converter according to designation of activation of a vehicle system, and
a defect diagnosis device giving a diagnosis of a defect at said electric load based on a voltage output between said first and second power supply lines becoming lower than a lower limit of an operating voltage at which a proper operation of said electric load is ensured,
wherein said control device comprises
a first voltage conversion control unit that controls said voltage converter by setting said voltage control value to a first voltage that is lower than said second power supply voltage and that is at least the lower limit of an operating voltage of said control device,
a defect diagnosis prohibition unit that prohibits a defect diagnosis operation of said defect diagnosis device in response to said voltage control value set to said first voltage,
a low temperature startup control unit that drive-controls said motor to start said internal combustion engine in response to a temperature of at least one of said internal combustion engine and said first power supply being not more than a predetermined threshold value, a second voltage conversion control unit that controls said voltage converter by setting said voltage control value to a second voltage that is at least said second power supply voltage in response to completion of the startup of said internal combustion engine, and a running permission unit that cancels the prohibition of the defect diagnosis operation of said defect diagnosis device and designating a running permission of said hybrid vehicle in response to said voltage control value being set at said second voltage.

2. The power supply control apparatus for a hybrid vehicle according to claim 1, wherein said control device further comprises output power estimation unit that estimates power that can be output by said first power supply based on a temperature and a state of charge of said first power supply, said first voltage conversion control unit sets said voltage control value to said first voltage when said estimated power that can be output from said first power supply becomes lower than a predetermined power required for the startup of said internal combustion engine, and sets said voltage control value to said second voltage control value to said second voltage when said estimated power that can be output from said first power supply is at least said predetermined power.

3. The power supply control apparatus for a hybrid vehicle according to claim 2, wherein said first voltage conversion control unit further comprises a required power estimation unit that estimates predetermined power required for the startup of said internal combustion engine, said required power estimation unit estimates supply power to said motor based on a temperature of said internal combustion engine, and calculates said predetermined power by adding power consumption of said control device estimated in advance and charging power of said second power supply to said estimated supply power to said motor.

4. The power supply control apparatus for a hybrid vehicle according to claim 3, wherein said first voltage conversion control unit feedback-controls said voltage converter such that an output voltage matches said voltage control value.

5. The power supply control apparatus for a hybrid vehicle according to claim 2, wherein said first voltage conversion control unit feedback-controls said voltage converter such that an output voltage matches said voltage control value.

6. The power supply control apparatus for a hybrid vehicle according to claim 1, wherein said first voltage conversion control unit feedback-controls said voltage converter such that an output voltage matches said voltage control value.

7. A power supply control method for a hybrid vehicle, said hybrid vehicle including a first power supply providing a first power supply voltage, a motor receiving supply of power from said first power supply to start an internal combustion engine, a voltage converter connected parallel to said motor with respect to said first power supply to voltage-convert said first power supply voltage according to a voltage control value for output between first and second power supply lines, a second power supply connected between said first and second power supply lines, providing a second power supply voltage that is lower than said first power supply voltage, an electric load connected between said first and second power supply lines to receive voltage from at least one of said voltage converter and said second power supply, a control device receiving voltage from at least one of said voltage converter and said second power supply to control startup of said internal combustion engine and said voltage converter according to designation of activation of a vehicle system, and a defect diagnosis device giving a diagnosis of a defect at said electric load based on a voltage output between said first and second power supply lines becoming lower than a lower limit of an operating voltage at which a proper operation of said electric load is ensured, said power supply control method comprising:

a first step of setting said voltage control value to a first voltage that is lower than said second power supply voltage and that is at least a lower limit of an operating voltage of said control device in response to a temperature of at least one of said internal combustion engine and said first power supply being not more than a predetermined threshold value, a second step of prohibiting a defect diagnosis operation of said defect diagnosis device in response to said voltage control value being set to said first voltage, a third step of feedback-controlling said voltage converter such that an output voltage matches said voltage control value, and drive-controlling said motor to start said internal combustion engine, a fourth step of feedback-controlling said voltage converter by setting said voltage control value to a second voltage that is at least said second power supply voltage in response to completion of the startup of said internal combustion engine, and a fifth step of canceling the prohibition of a defect diagnosis operation of said defect diagnosis device, and designating a running permission of said hybrid vehicle in response to said voltage control value being set to said second voltage.

8. The power supply control method for a hybrid vehicle according to claim 7, wherein said first step comprises a first substep of estimating power that can be output by said first power supply based on a temperature and a state of charge of said first power supply, a second substep of setting said voltage control value to said first voltage when said estimated power that can be output by said first power supply becomes lower than a predetermined power required for the startup of said internal combustion engine, and a third substep of setting said voltage control value to said second voltage when said estimated power that can be output by said first power supply is at least said predetermined power.

\* \* \* \* \*